United States Patent
Ocher et al.

(10) Patent No.: US 10,979,242 B2
(45) Date of Patent: Apr. 13, 2021

(54) INTELLIGENT PERSONAL ASSISTANT CONTROLLER WHERE A VOICE COMMAND SPECIFIES A TARGET APPLIANCE BASED ON A CONFIDENCE SCORE WITHOUT REQUIRING UTTERING OF A WAKE-WORD

(71) Applicant: SAP SE, Walldorf (DE)

(72) Inventors: Alexander Ocher, San Jose, CA (US); Andrey Belyy, Sunnyvale, CA (US); Viktor Lapitski, Mountain View, CA (US)

(73) Assignee: SAP SE, Walldorf (DE)

( * ) Notice: Subject to any disclaimer, the term of this patent is extended or adjusted under 35 U.S.C. 154(b) by 180 days.

(21) Appl. No.: 16/000,830

(22) Filed: Jun. 5, 2018

(65) Prior Publication Data
US 2019/0372794 A1 Dec. 5, 2019

(51) Int. Cl.
| | |
|---|---|
| *G10L 25/78* | (2013.01) |
| *G10L 15/22* | (2006.01) |
| *G08B 13/14* | (2006.01) |
| *G10L 17/22* | (2013.01) |
| *G10L 15/30* | (2013.01) |
| *H04L 12/28* | (2006.01) |
| *G06F 9/54* | (2006.01) |
| *G10L 15/18* | (2013.01) |
| *G10L 15/26* | (2006.01) |

(52) U.S. Cl.
CPC ............ *H04L 12/282* (2013.01); *G06F 9/541* (2013.01); *G10L 15/1815* (2013.01); *G10L 15/26* (2013.01); *G10L 15/30* (2013.01); *G10L 17/22* (2013.01)

(58) Field of Classification Search
CPC ..... G10L 25/78; G10L 15/22; G10L 15/1815; G10L 15/30; G10L 17/22; G08B 13/1427
USPC ........................................................ 704/275
See application file for complete search history.

(56) References Cited

U.S. PATENT DOCUMENTS

| | | | |
|---|---|---|---|
| 10,115,400 B2* | 10/2018 | Wilberding | G10L 15/30 |
| 10,460,215 B2* | 10/2019 | Herold | G08B 13/1427 |
| 2018/0096681 A1* | 4/2018 | Ni | G10L 15/1815 |
| 2018/0108351 A1* | 4/2018 | Beckhardt | G10L 15/22 |
| 2019/0096398 A1* | 3/2019 | Sereshki | G10L 25/78 |

* cited by examiner

*Primary Examiner* — Farzad Kazeminezhad
(74) *Attorney, Agent, or Firm* — Fountainhead Law Group P.C.

(57) ABSTRACT

Embodiments of the present disclosure pertain to a personal assistant controller. In one embodiment, the present disclosure includes a computer implemented method comprising receiving a voice audio signal in the personal assistant controller, converting the voice audio signal into a target command corresponding to one of a plurality of personal assistants, wherein different personal assistants comprise different target command protocols for executing different operations on different network enabled appliances, and sending the target command for execution by a backend system corresponding to the one of the plurality of personal assistants, and in accordance therewith, performing an operation on the backend system.

19 Claims, 7 Drawing Sheets

INTELLIGENT PERSONAL ASSISTANT CONTROLLER WHERE A VOICE COMMAND SPECIFIES A TARGET APPLIANCE BASED ON A CONFIDENCE SCORE WITHOUT REQUIRING UTTERING OF A WAKE-WORD

BACKGROUND

The present disclosure relates to computing, and in particular, to systems and methods for controlling computerized personal assistants.

Personal assistants are devices deployed in various locations that allow users to speak requests and receive responses and/or perform various computing operations. For example, personal assistants such as the Amazon® Alexa® ("Alexa"), Google Assistant® ("GA"), and Apple® Siri® ("Siri"), allow users to speak commands. The commands are processed by backend systems, and responses or other computing operations are performed. However, personal assistants are typically tied to proprietary protocols. Thus, different personal assistants have different unique protocols for command and control. If a particular location has multiple different personal assistants using different protocols, it becomes challenging for a user to interface with the devices.

Embodiments of the disclosure provide advantageous techniques for controlling personal assistants.

SUMMARY

Embodiments of the present disclosure pertain to a personal assistant controller. In one embodiment, the present disclosure includes a computer implemented method comprising receiving a voice audio signal in the personal assistant controller, converting the voice audio signal into a target command corresponding to one of a plurality of personal assistants, wherein different personal assistants comprise different target command protocols for executing different operations on different network enabled appliances, and sending the target command for execution by a backend system corresponding to the one of the plurality of personal assistants, and in accordance therewith, performing an operation on the backend system.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

Figure 1:
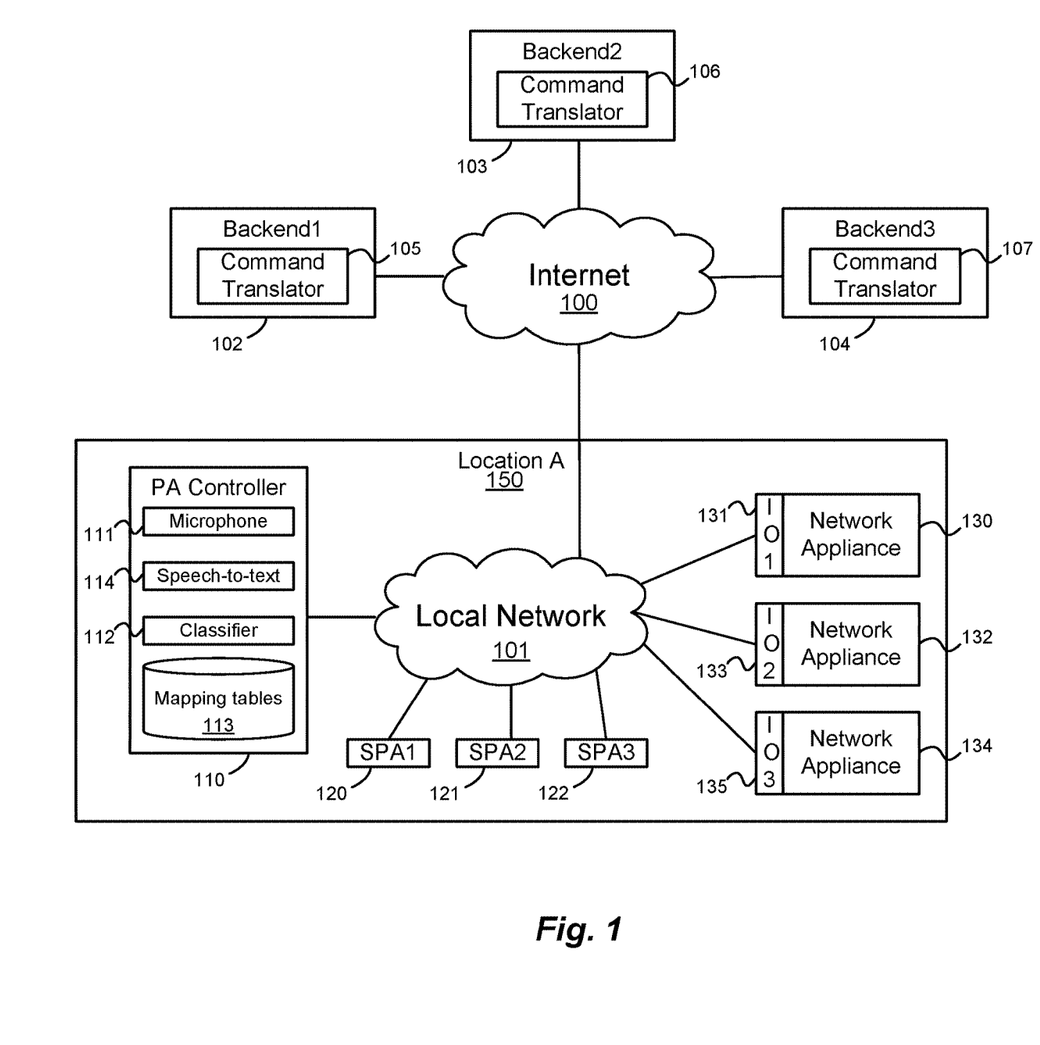
FIG. 1 illustrates controlling personal assistants according to one embodiment.

FIG. 1 illustrates controlling personal assistants according to one embodiment. Features and advantages of the present disclosure include a personal assistant (PA) controller 110 that provides a single unified interface to multiple different personal assistant systems to allow users to interface with and/or control various devices using a single device. In one embodiment, a particular location 150 may include multiple different smart personal assistants ("SPAs") 120-122, such as Alexa, Siri, or GA, for example. The SPAs may be embedded in physical devices located around location A 150, such as a home, office building, or warehouse, for example. In one embodiment, the SPAs may be used to control network enabled appliances 130, 132, and 134. For example, SPA1 120 may be used to control network enabled appliance 130, SPA2 121 may be used to control network enabled appliance 132, and SPAS 122 may be used to control network enabled appliance 135. Additionally, SPAs 120-122 may receive voice audio inputs and perform backend computer processing operations and return results, such as returning the time, a response to a question, or the like.

Typically, different SPAs perform operations using different protocols and their own backend systems. SPA1 120 may perform operations on backend system 102 (e.g., a backend Alexa System), SPA2 121 may perform operations on backend system 103 (e.g., a backend GA System), SPA3 122 may perform operations on backend system 104 (e.g., a backend Siri System). One challenge with using different personal assistants to control different network enabled appliances or perform backend operations is that different personal assistants use different protocols. For example, the network enabled appliances may only be configured to respond to instructions from a particular type of system. For example, SPA1 may be an Alexa system, which may be used to control network enabled appliance 130 (e.g., an oven). SPA1 may require a very specific audio voice command to control appliance 130. SPA2 may be a GA system, which may be used to control network enabled appliance 132 (e.g., a thermostat). SPA2 may require a very specific audio voice command to control appliance 132. Embodiments of the present disclosure include a PA controller 110 for controlling different personal assistants comprising different target command protocols for executing different functions (e.g., shopping, searching) or operations on different network enabled appliances, for example. Additionally, different SPAs may be better at performing different operations than other SPAs. Embodiments disclosed herein may further improve which SPA is used to perform different operations over time so that the best suited SPA for a particular task is accessed when a particular task (or command) is received, for example.

In one embodiment, PA controller 110 may include a microphone 111. A user may speak a request to the PA controller and the PA controller receives a voice audio signal. The voice audio signal may be converted into a target command having a target command protocol corresponding to one of a plurality of personal assistants, and the target command may be executed to perform an operation (e.g., on a target network enable appliance). The target command may be a command understandable by one of the SPA systems in one of a plurality of different protocols.

For example, the voice audio signal may be converted into text using speech recognition/speech-to-text module 114, for example. In one embodiment, the text may be processed using classifier 112. Classifier 112 may analyze the text and produce a category and a first command, for example. The category may specify a network enabled appliance (e.g., oven, microwave, thermostat) having a corresponding target command protocol, for example. The category may be a word in the text specifying a network appliance (oven) or backend function (shop), for example. In one embodiment, the first command specifies an operation to be performed on the target network enabled appliance (e.g., preheat, set clock, set temperature).

In one embodiment, categories and first commands may be mapped to a target command, where the target command is in the protocol of the particular personal assistant used to control the network enabled appliance. For example, if the category is "oven," and the oven is controlled by Alexa, then the category and first command may be translated by the PA controller into a target command understandable by Alexa. However, if the category is "thermostat," and the thermostat is controlled by GA, then the category and first command may be translated by the PA controller into a target command understandable by GA. In one embodiment, the category may be mapped to one of a plurality of personal assistant types, such as GA, Alexa, or Siri, for example, so the appropriate system may be determined. Additionally, the category and first command may be mapped to the target command understandable by GA, Alexa, or Siri.

In one embodiment, a plurality of categories may be associated with a plurality of personal assistant types, and a plurality of first commands may be associated with a plurality of target commands. The categories and associated personal assistant types and the plurality of first commands and associated target commands may be stored in at least one table of a database 113 (e.g., as mapping tables). For instance, a category field of the table may store the category value "oven" and an associated personal assistant field may store "Alexa" to specify the system used to process the "oven" category. Numerous category:personal_assistants may be associated as rows of a table, for example (e.g., <microwave:Siri>; <thermostat:GA>; <shopping:Alexa>; <geography:GA>; etc. . . . ). Additionally, first commands and associated target commands may be stored in tables. For example, a first command field of a table may store the command value of "heat" and an associated target command field may store the text "Ok Alexa, tell GE to <command=heat><category=oven>" (i.e., the required text protocol to cause the Alexa backend to issue instructions to a GE oven). As illustrated in this example, the target command may be stored as a text template, where the first command and category are inserted into variables for the first command and category in the target text template to create a complete target text command. Similarly, other first_commandtarget_commands may be associated as rows of a table (e.g., <60 degrees>:<"ok google, set <category="thermostat"> to <command>").

As yet another example, the mapping of user input to SPA target command may go through the following process. First, the audio input is converted to text and parsed to an object, command, and operands. Next, a rules database may be used to find out the format sentence for the given object (e.g., similar to format specification for System.out.printf( ) method in Java language: http://www.javawithus.comitutorial/displaying-text-using-printf-method) and any SPA-spe-
cific requirements. An SPA-specific command may be formed using the format specification, command, and operands, for example. Then, the resulting command may be sent to the SPA for execution. More specifically, for the GE oven example, a user may say "Heat oven to 350 degrees". The audio is classified as an appliance control request, with object="oven", command="heat" and parameters="to 350 degrees". The rule from the database is: "Alexa, tell GE to % cmd oven % operands". The substitution yields the resulting command: "Alexa, tell GE to heat oven to 350 degrees", which is sent to Alexa for execution. The same or similar approach may be applies to other examples, for example, the command "increase temperature by 5 degrees" using the rule "OK Google, % cmd temperature % operands" results in "OK Google, increase temperature by 5 degrees". Similar examples can be made for dishwasher, drier, etc.

Once the target command is obtained, it may be executed, and in accordance therewith, an operation may be performed on a target network enabled appliance or backend system. For example, the target command "Ok Alexa, tell GE to heat oven" may be sent from PA controller 110 to a backend system corresponding to the associated personal assistant (e.g., to the backend system 102 for Alexa). In this example, the target command is a text command in the target protocol (here, the protocol for Alexa). In this example, the Alexa backend system may receive the target command in the target protocol for Alexa ("Ok Alexa, tell GE to heat oven") and backend 102 may parse the target command and issues an instruction from the backend to network appliance 130 over Internet 100, local network 101, and an input/output interface (IO1) 131 on oven 130, for example. Similarly, if the target command were determined to be associated with GA, the target command would be sent to the GA backend (e.g, backend 102), which would translate the command into an instruction for another network enabled appliance, for example (e.g., to change a temperature of a thermostat). Converting the target commands into instructions may be carried out by different command translators 105-107 on backends 102-104, respectively, each requiring target commands in different protocols to convert the commands to instructions to carry out various operations, for example.

As mentioned above, in some embodiments the target commands, when executed by a backend system, perform operations on the backend. In addition to controlling network appliances, personal assistants may be used to perform a wide range of other functions, such as shopping, searching for information on various topics, sending messages, and the like. Features and advantages of the present disclose include a unified interface for invoking backend features of different personal assistant systems. Furthermore, different personal assistant systems may be better at certain tasks that other personal assistant systems. Alexa may be superior for shopping, GA may be superior for searching topics, and Siri may be superior for selecting music, for example. Features and advantages of the present disclosure include updating the mappings between categories and system types (e.g., stored in database 113) as the system receives feedback from the user as to whether a voice audio signal resulted in a successful response.

The following is another example process. First, the PA Controller receives a voice input from the user, for example: "Where I can go for $500?" PA Controller may convert the request to text, either locally or using its own cloud service, using Hidden Markov Modeling, neural networks or other methods, for example. After conversion to text, it is analyzed to determine the type: request for assistance (not user feedback or appliance control). The classifier may further determine that the request is related to shopping and travel, for example. Using an associated rules database for requests for assistance, this category may be mapped to Alexa, with the mapping translating the command "Where I can go for $800?" to "Alexa, ask Kayak<command:=where I can go for $800>". The converted request is sent to Alexa. Next, Alexa parses the request, and triggers the Kayak skill. The Kayak skill then uses the backend function of Kayak Explore (https://www.kayak.com/explore/) to answer the question. Accordingly, Alexa receives the answer, prepares the reply, and sends it back to PA Controller. PA Controller then communicates the answer to the user. In response, the user may says"OK". The user's response is converted to text, and analyzed to to determine that the answer can be categorized as a user feedback, for example. The classifier may further determine that the feedback is positive. Since there is already a rule that such requests are currently answered by Alexa and the reply was satisfactory, the system can do nothing or increase the confidence level that such requests should continue to be handled by Alexa, if this information is a part of the rule.

Embodiments of the disclosure may include a system that learns by adding rules to the database(s). Unlike traditional SPAs, PA Controller does not learn directly how to better answer questions; rather, it learns how to better direct user input for processing. The rules can be generated automatically (for example from information searches), generated from user input or supervised learning and training mode, or imported from file.

For example, automatic generation of rules can be done by the system by comparing the results of searches that were simultaneously sent to more than one SPA. For instance, Alexa may not be able to answer questions like, "What's the average age of a human being?" Google Home, however, may be better able to produce the answer right away. Some SPA devices may be able to do a better job in some areas than other SPA devices. For example, when asked both devices the same question, Alexa may be able to come up with the precise desired answer, while Google Home may reply with a less precise answer. A very simple way to check for accuracy of a response is to look for the predefined reply like Alexa's "Sorry, I don't know the answer to your question.", while a more sophisticated algorithm may classify which reply was closer to the original question (for example, getting a number as a response to a quantitative question vs. getting a list of items).

As mentioned above, other embodiments may generate rules from user input or supervised learning. As one example, the feedback to a SPA's response may be stored as a rule. For example, if an SPA responds with an inappropriate response (e.g., for children), then the user's response to the SPA's response may indicate that a rule should be generated (e.g., "STOP, ALEXA, STOP!"). Such feedback generate a rule not to ask Alexa to play certain content, for example.

As mentioned above, in some embodiments rules can be uploaded from files. For example, as an initial setup, rules can be uploaded to direct shopping to Alexa and other searches to Google. Manufacturers can also provide rule files with specific grammar rules to translate user input to the format understood by their appliances.

The system can also store the values for each type of request, with the median value becoming the default value. For example, repeated requests, say, to preheat the oven to 350 F, will make 350 the default value; so a request with missing information, e.g. "Preheat the oven", will use the default value to request Alexa to preheat the oven to 350 F, for example.

While the above embodiment illustrates converting an audio voice signal to a target command being performed locally in the PA controller, it is to be understood that some or all of the steps pertaining to converting the voice audio signal into the target command may also be performed remotely on a backend computer system as described in more detail below, for example. For example, can be performed in PA Controller's own cloud computing backend.

Figure 2:
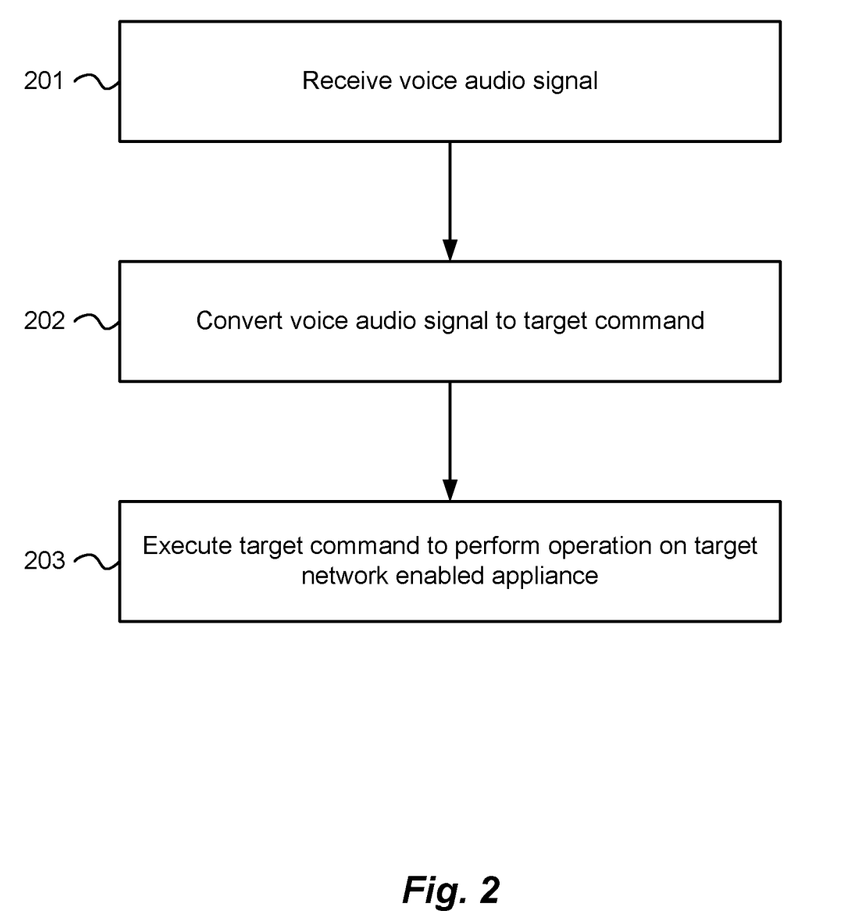
FIG. 2 illustrates a method according to one embodiment.

FIG. 2 illustrates a method according to one embodiment. At 201, a voice audio signal is received in a personal assistant controller. The controller may include a microphone and a speech recognition engine, for example. At 202, the voice audio signal is converted into a target command corresponding to one of a plurality of personal assistants, where different personal assistants comprise different target command protocols for executing different operations (e.g., on different network enabled appliances). For example, the voice audio signal may be converted into an Alexa target command, a Siri target command, or a GA target command, where the different systems have different target command protocols they may require to perform certain operations, for example. At 203, the target command is executed. For example, the target command may be sent to a particular backend system for processing. Accordingly, an operation is performed, for example, on a target network enabled appliance or some other backend functionality.

Figure 3:
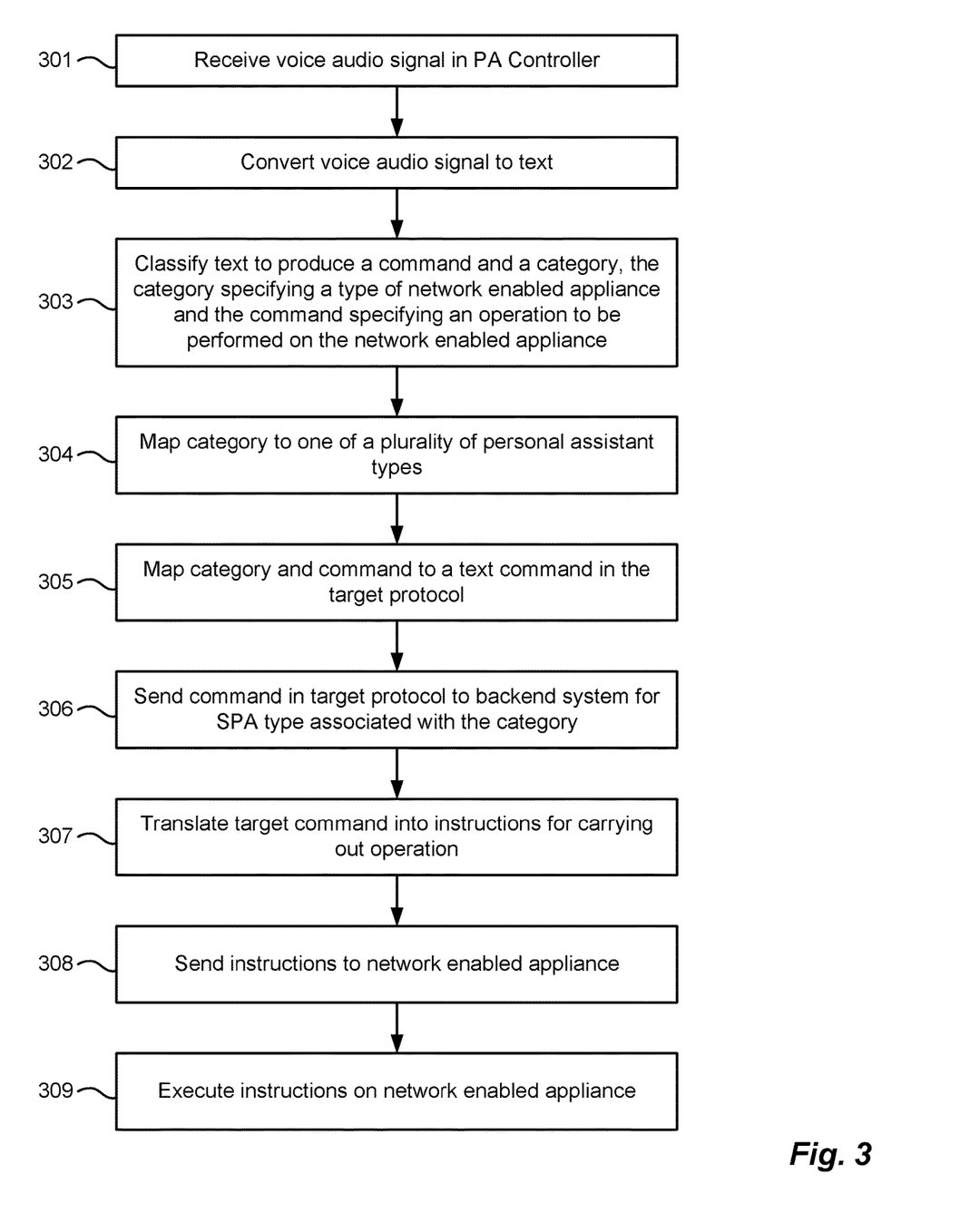
FIG. 3 illustrates another example method of controlling personal assistants according to one embodiment.
Figure 4:
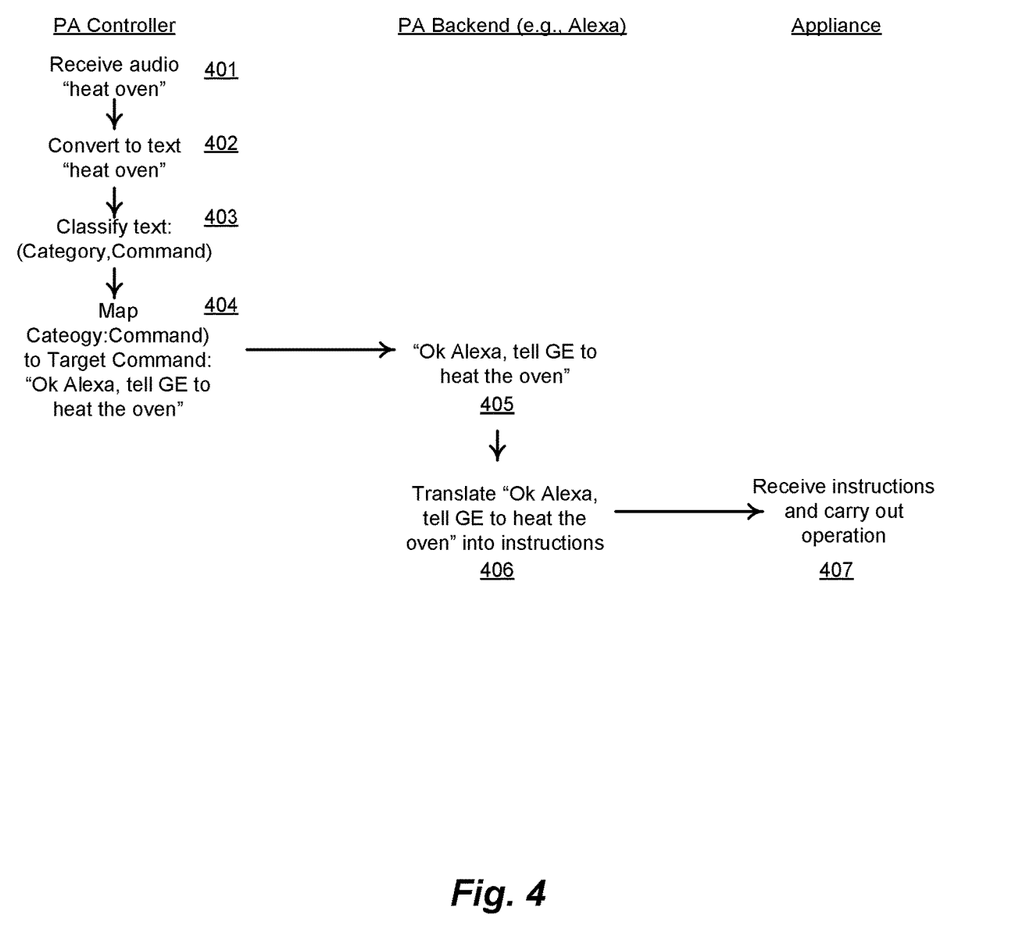
FIG. 4 illustrates an example interaction between system components according to one embodiment.

FIGS. 3-4 illustrate another example method of controlling personal assistants and interaction between system components according to one embodiment. For example, at 301 a PA controller may receive a voice audio signal. This is illustrated at 401 in FIG. 4, where the PA controller receives "heat oven." At 302, the voice audio signal is converted to text as illustrated at 402. At 303, the text is classified to produce a command and a category. In this example, the category specifies a type of network enabled appliance (e.g., an oven, microwave, or thermostat). In another embodiment, the category may correspond to a topic to be searched for (e.g., geography) or a task to be performed (e.g., shopping), for example. Different SPAs may control different network appliances or be more accurate at performing different backend operations. Accordingly, the category provides information to the system about the subject of the operation ("oven," "shopping," etc. . . . ) so that the subject of the operation may be mapped to the best (or only) SPA for performing the operation for the particular subject. The command specifies the operation to be performed (e.g., heat, search, etc. . . . ). The category and command are illustrated in FIG. 4 at 403.

Example embodiments of a classifier work with the voice input that was converted into text, for example. Once in the text form, it may be classified in one of three types: user feedback, appliance control, and request for assistance. Example steps in Natural Language Processing (NLP) are language detection, tokenization, Part of Speech tagging, constituent parsing, Named Entity Resolution, etc. Accordingly, text may be classified into categories along with a confidence score, such as: category: "/Internet & Telecom/ Mobile & Wireless/Mobile Apps & Add-Ons" with confidence: 0.6499999761581421", for example. When the text is determined to be user feedback, its sentiment can be analyzed to produce a model that can classify a sentence based on its sentiment (e.g., with 1 being a purely positive sentiment, 0 being a purely negative sentiment and 0.5 being neutral). In addition, user feedback may be analyzed on the volume level of the user input and other characteristics to detect satisfaction, frustration, etc. Once the input is classified, the request may be processed using the appropriate rules of the specific rule-processing engine (user feedback, appliance control, and request for assistance).

At 304, the category may be mapped to one of a plurality of personal assistant types. For example, as mentioned above, categories may be associated with personal assistant types and stored in a database (e.g., as rows of a table). "Oven" may be associated with "Alexa," "Thermostat" may be associated with "GA," "Shopping" may be associated with "Alexa," and so on. Accordingly, once the category is known, the type of system used to carry out the operation can be determined from the mappings. Similarly, at 305, the category and the first command may be mapped to the target command. For example, the first command may be associated with a particular target command in the protocol of the system to be used to carry out the operation. For instance, the command "search" may be associated with a target command operable on Alexa in one row of a table, associated with a target command operable on GA in another row of the table, and associated with a target command operable on Siri in yet another row of the table. The mapping of the category to the type of SPA system may indicate which command mapping to use. Thus, if the category is mapped to "Alexa," then the mapping of the first command to a target command operable on Alexa may be selected to produce the target command. As mentioned above, a target command may be a text command including variables for inserting the category and first command (e.g., "Ok Alexa, tell GE to <command=heat> the <category=oven>"). In this example, the mappings are performed in the PA controller as illustrated at 404.

The PA Controller may also work in a continuous interactive mode, listening to a conversation and displaying or otherwise communicating information it considers relevant. For example, the PA controller system may connect via Google to get sales numbers for the current quarter, or asking Alexa about the best mutually convenient meeting time for the follow up next day, or directing Siri to play a marketing clip. The classifier can determine the parts of the conversation that can be classified as requests for assistance, send them to an appropriate SPA and communicate the answers back. SPAs may not need to be able to support this functionality themselves and the users don't need to do anything special to receive this information as the conversation progresses, for example.

At 306, the target command in the target protocol is sent to the backend system for the SPA type associated with the category. This is also illustrated in FIG. 4 at 405. At 307, the target command is translated into one or more instructions to carry out the command. As illustrated in FIG. 4 at 406, the backend system for Alexa translates the target command "Ok Alexa, tell GE to heat the oven" into instructions understandable by an Alexa controlled General Electric (GE) oven to carry out the "heat oven" operation, for example. At 308, the instructions are sent from the backend system to the particular network enabled appliance. At 309, the instructions are executed by the network enabled appliance. Steps 308 and 309 are illustrated in FIG. 4 at 407.

One example implementation of a rule-based technology uses the rule-processing engine to execute the rule scripts expressed in an SPA-specific grammar that may contain both literal expression and variable part. The literal expression remains constant while the variable part contains one command and may also contain one or more operands. Each script is stored as a template associated with a specific object and after processing becomes a command that is understood by the target system such as Alexa.

The rules are stored in database tables. There may be types of requests: user feedback, appliance control, and request for assistance. User feedback is used to determine whether the previous request was successful or not; it is used to update the rules for other two types. Appliance control and request for assistance use a table where generated rules are stored, for example:

Record 1:
RequestType: Appliance control
Class: Oven
Info1: Oven1
Assistant: Alexa
Rule: Alexa, tell GE to % cmd oven % operands
Confidence: 100%
Record 2:
RequestType: Request for assistance
Class: Travel/shopping
Info1: travel/booking, budget travel
Assistant: Alexa
Rule: Alexa, ask Kayak % command
Confidence: 95%

The information above is merely one example of a data structure that may be used. There could be a lot of other tables and fields: for example, as mentioned above, an additional table may store request history for each rule so most often used value (median) can be used as a default. Additionally, there can be a separate list of synonyms and nicknames; there could be date/time of creation/update and the log of activities, etc.

Figure 5:
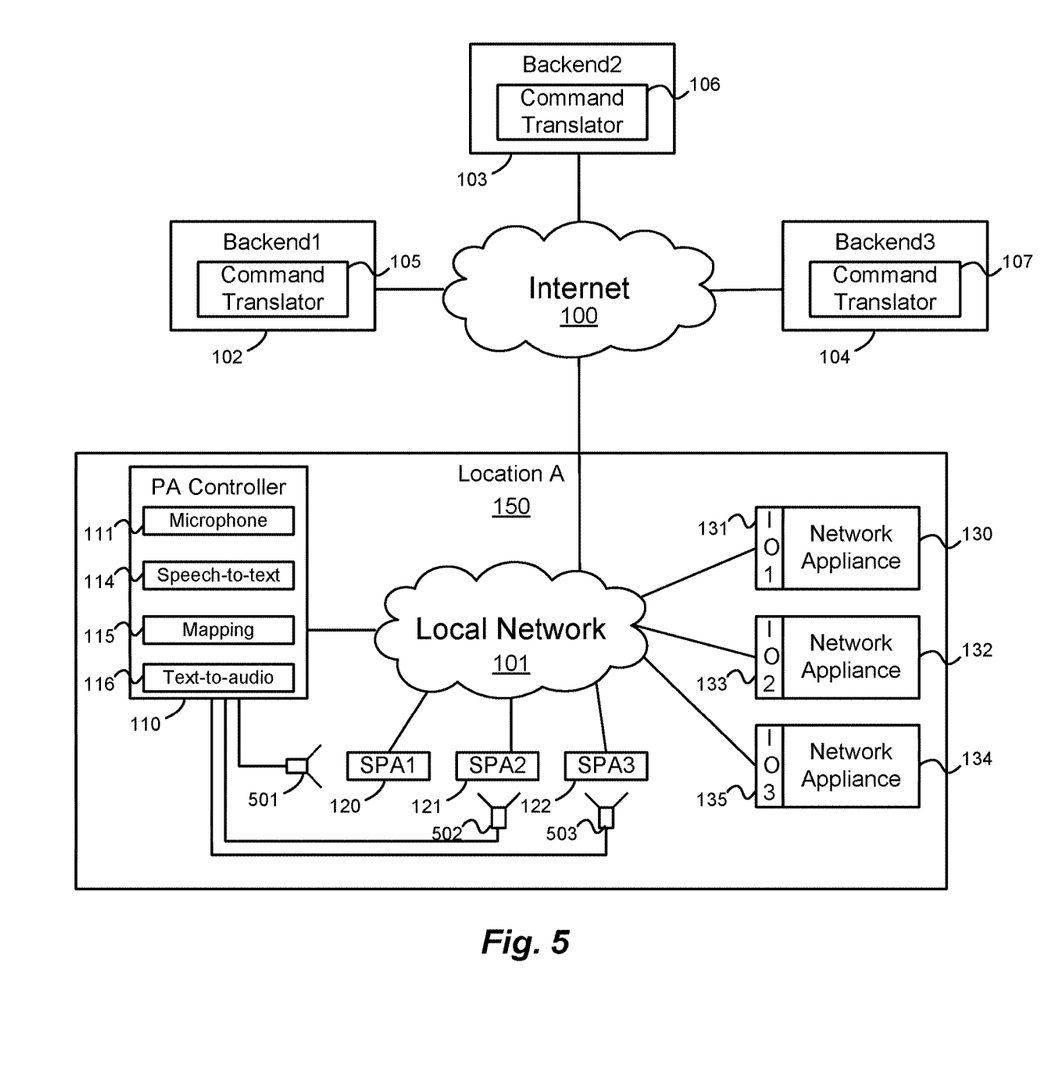
FIG. 5 illustrates an example of controlling personal assistants according to one embodiment.

FIG. 5 illustrates an example of controlling personal assistants according to one embodiment. In this example, after the input audio voice signal is translated to text, classified into a category and first command, and mapped to a target command, the target command is converted from text to audio and played over a speaker located proximate to each SPA 120-122. For example, if the voice audio signal results in a target command for Alexa, then PA controller 110 may convert the target command into an audio signal and play it over a speaker 510 located within hearing distance of an Alexa personal assistant (e.g., SPA1). Alternatively, if the voice audio signal results in a target command for GA, then PA controller 110 may convert the target command into an audio signal and play it over a speaker 502 located within hearing distance of an GA personal assistant (e.g., SPA2). Similarly, if the voice audio signal results in a target command for Siri, then PA controller 110 may convert the target command into an audio signal and play it over a speaker 503 located within hearing distance of an Siri personal assistant (e.g., SPA3). Speakers 501-503 may be wired and/or wireless speakers, for example, coupled to PA controller 110. Accordingly, each SPA may receive the converted voice audio signal in its own target command protocol and relay the command to its own backend for processing and performing the operations specified in the target command.

Figure 6:
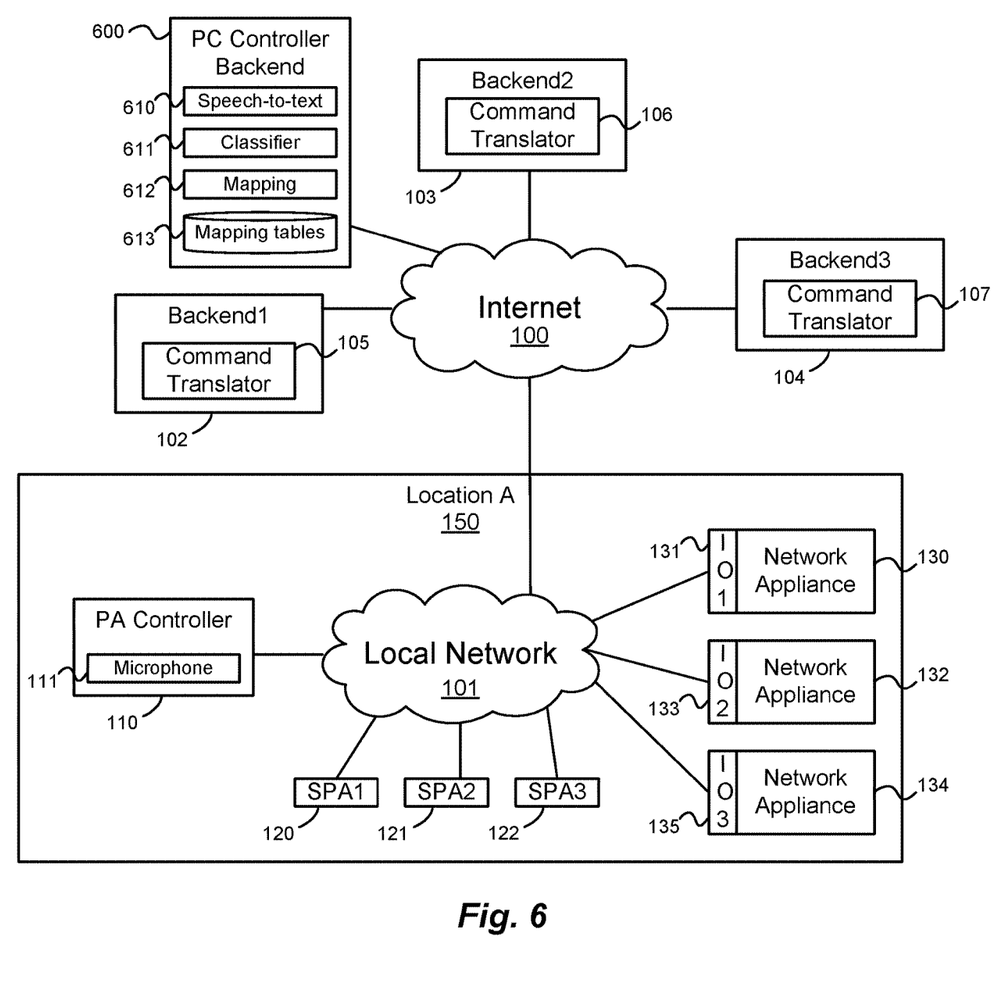
FIG. 6 illustrates an example of controlling personal assistants according to another embodiment.

FIG. 6 illustrates an example of controlling personal assistants according to another embodiment. As mentioned above, processing the voice audio signal may be performed remotely. In this example, the voice audio signal is received in a microphone 111 of PA controller 110 and sent to PC controller backend 600 (e.g., a remote server computer) for processing, including text-to speech 610, classification 611, and mapping 612 using mapping tables 613, for example, to produce the target command. The target command is then sent to the appropriate backend 102-104 for translation into instructions for carrying out the operation.

In various other embodiments, multiple users may have their preferences stored in the database to use their preferred SPA by default for particular uses, and the PA controller may route the requests to the default SPA if the user does not want to use the multi-SPA capabilities.

In another embodiment, an Application Programming Interface (API) can be provided for the PA Controller, so third-party developers can write the code for one platform instead of having to support multiple platforms (Alexa, Google, etc.).

Other embodiments may include optimizing repeated requests (in addition to the default value processing mentioned above). For example, if the user repeatedly requests the same thing, being a veggy pizza with extra cheese or real-time sales report for the Midwest region for the current quarter, giving the request a name such as "the usual sales report" will avoid the user having to explain what exactly s/he wants over and over. This benefit can be provided even if the underlying SPA does not support it by semantically analyzing the service request and recording the sequence of events for this request to be sent, for example, to Alexa in an interactive way without user's involvement beyond the initial request.

In yet another embodiment, the PA Controller can interface with devices that belong to another user for multi-owner, multi-device interaction. For example, it may interact with user-owned Google Home to propose an appointment available time from Outlook to a user using the voice interface and receive user reply to get the best time by coordinating with other users and their devices and schedules.

Yet other embodiments may include authentication features. For example, a PA controller system may allow a user to authenticate with it and then use it as single sign-on access method for any IPA. For example, if a bank provides an Alexa skill to access checking account information and a hospital provides a Google Action to access user's medical information, the PA Controller may, once it authenticates the user, work with any SPA and provide securely stored credentials without the user having to explicitly authenticate with each SPA (similar to my previous DSAS invention). Such capability may be enabled for several users, with the limitation of only one user being able to securely use system at any given time, for example.

Figure 7:
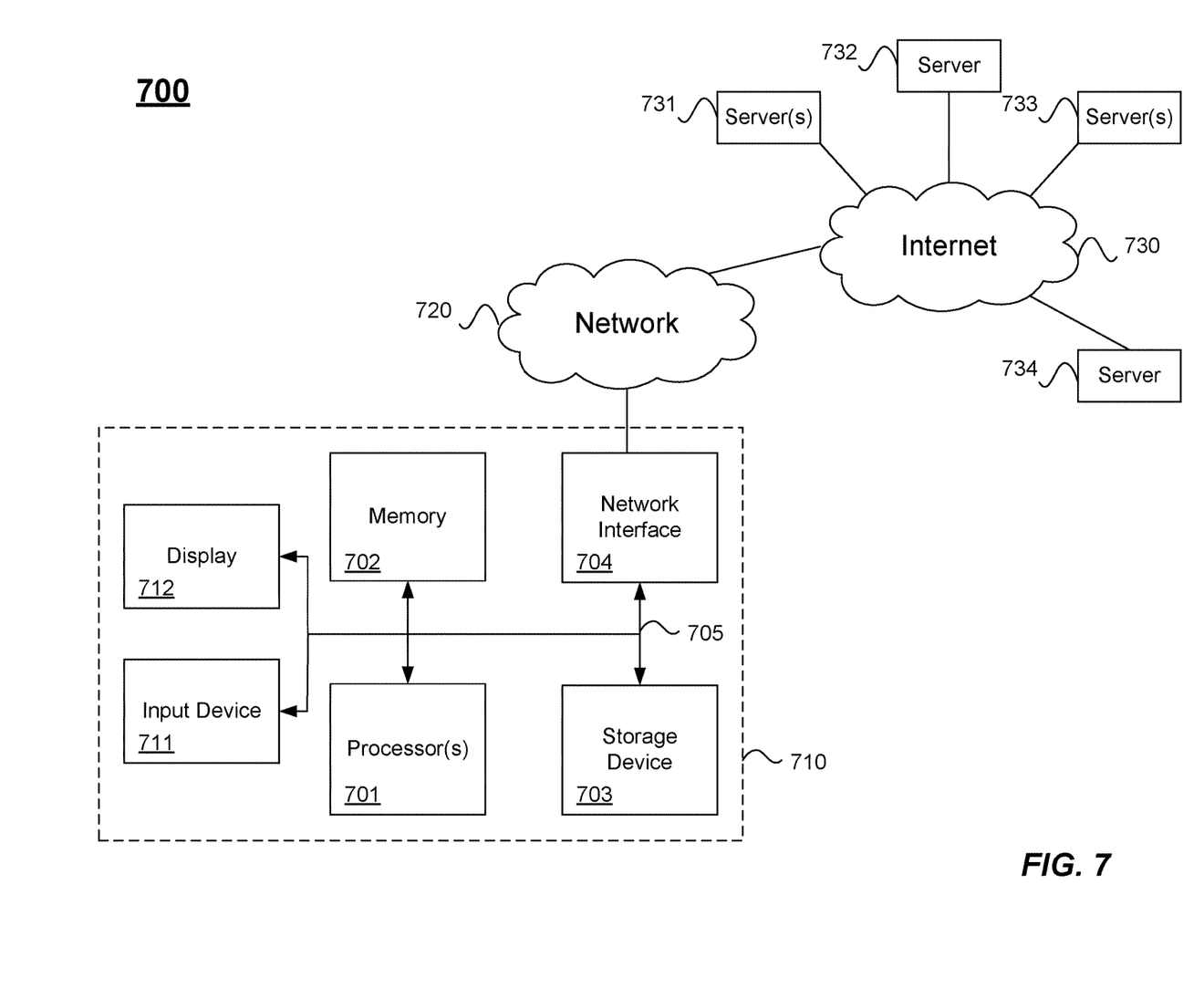
FIG. 7 illustrates computer system hardware configured according to the above disclosure.

FIG. 7 illustrates computer system hardware configured according to the above disclosure. The following hardware description is merely one illustrative example. It is to be understood that a variety of computers topologies may be used to implement the above described techniques. An example computer system 710 is illustrated in FIG. 7. Computer system 710 includes a bus 705 or other communication mechanism for communicating information, and one or more processor(s) 701 coupled with bus 705 for processing information. In some systems, bus 705 represents multiple specialized buses for coupling various components of the computer together, for example. Computer system 710 also includes a memory 702 coupled to bus 705 for storing information and instructions to be executed by processor 701, including information and instructions for performing some of the techniques described above, for example. Memory 702 may also be used for storing programs executed by processor(s) 701. Possible implementations of memory 702 may be, but are not limited to, random access memory (RAM), read only memory (ROM), or both. A storage device 703 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 703 may include source code, binary code, or software files for performing the techniques above, for example. Storage device 703 and memory 702 are both examples of non-transitory computer readable storage mediums.

Computer system 710 may optionally be coupled via bus 705 to a display 712 for displaying information to a computer user. Input device 711 is coupled to bus 705 for communicating information and command selections from the user to processor 701. The combination of these components allows the user to communicate with the system.

Computer system 710 also includes a network interface 704 coupled with bus 705. Network interface 704 may provide two-way data communication between computer system 710 and a local network 720. Network 720 may represent one or multiple networking technologies, such as Ethernet, local wireless networks (e.g., WiFi), or cellular networks, for example. The network interface 704 may be a wireless or wired connection, for example. Computer system 710 can send and receive information through the network interface 704 across a wired or wireless local area network, an Intranet, or a cellular network to the Internet 730, for example. In some embodiments, computer system 710 may access data and features on backend software systems that may reside on multiple different hardware servers 731-735 on-prem or across the Internet. One or more of servers 731-735 may also reside in a cloud computing environment, for example.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A computer implemented method comprising:
receiving a voice audio signal in a personal assistant controller, wherein the voice audio signal does not include any of a plurality of wake-words associated with a plurality of personal assistants;
converting the voice audio signal into text;
classifying the text to produce a plurality of categories, each category associated with a first command and wherein each category is associated with a confidence score that specifies a network enabled appliance having a corresponding target command protocol and the first command specifies an operation to be performed on the target network enabled appliance;
classifying the text to produce a target command corresponding to one of the plurality of personal assistants, wherein different personal assistants comprise different target command protocols for executing different operations on different network enabled appliances and wherein the target command includes the wake-word of the corresponding one of the plurality of personal assistants; and
executing the target command, and in accordance therewith, performing an operation on a target network enabled appliance.

2. The method of claim 1 further comprising:
mapping the category to one of a plurality of personal assistant types; and
mapping the category and the first command to the target command.

3. The method of claim 2 further comprising:
associating a plurality of categories with a plurality of personal assistant types;
associating a plurality of first commands with a plurality of target commands;
storing plurality of categories and associated personal assistant types and the plurality of first commands and associated target commands in at least one table of a database.

4. The method of claim 2 wherein the target command is a text command in the target command protocol.

5. The method of claim 2 wherein the target command is stored as a text template, and wherein the first command and category are inserted into the target text template to create a final target text command.

6. The method of claim 1 wherein converting the voice audio signal into the target command is performed locally in the personal assistant controller.

7. The method of claim 1 wherein converting the voice audio signal into the target command is performed remotely on a backend computer system.

8. The method of claim 1 wherein executing the target command comprises:
converting the target command to an audio signal; and
playing the audio signal through a speaker located within an audio range of the one of the plurality of personal assistants.

9. The method of claim 1 wherein executing the target command comprises sending the target command to one of a plurality of backend systems corresponding to the one of the plurality of personal assistants, wherein the one of the plurality of backend systems translates the target command into instructions for causing the target network enabled appliance to perform a specified operation.

10. The method of claim 1 further comprising changing the target command generated in response to the voice audio signal over time based on user feedback.

11. A non-transitory machine-readable medium storing a program executable by at least one processing unit of a computer, the program comprising sets of instructions for:
receiving a voice audio signal in a personal assistant controller, wherein the voice audio signal does not include any of a plurality of wake-words associated with a plurality of personal assistants;
converting the voice audio signal text;
classifying the text to produce a plurality of categories, each category associated with a first command and wherein each category is associated with a confidence score that specifies a network enabled appliance having a corresponding target command protocol and the first command specifies an operation to be performed on the target network enabled appliance;
classifying the text to produce into a target command corresponding to one of a plurality of personal assistants, wherein different personal assistants comprise different target command protocols for executing different operations on different network enabled appliances and wherein the target command includes the wake-word of the corresponding one of the plurality of personal assistants; and
executing the target command, and in accordance therewith, performing an operation on a backend system for the one of the plurality of personal assistants.

12. The non-transitory machine-readable medium of claim 11 wherein the operation on a backend system for the one of the plurality of personal assistants sends instructions to a network enabled appliance.

13. The non-transitory machine-readable medium of claim 11 wherein executing the target command comprises:
converting the target command to an audio signal; and
playing the audio signal through a speaker located within an audio range of the one of the plurality of personal assistants.

14. The non-transitory machine-readable medium of claim 11 wherein executing the target command comprises sending the target command to one of a plurality of backend systems corresponding to the one of the plurality of personal assistants, wherein the one of the plurality of backend systems translates the target command into instructions for causing the target network enabled appliance to perform a specified operation.

15. The non-transitory machine-readable medium of claim 11 further comprising changing the target command generated in response to the voice audio signal over time based on user feedback.

16. A personal assistant controller comprising:
a processor; and
a non-transitory machine-readable medium storing a program executable by the processor, the program comprising sets of instructions for:
receiving a voice audio signal in the personal assistant controller, wherein the voice audio signal does not include any of a plurality of wake-words associated with a plurality of personal assistants;
converting the voice audio signal into text;
classifying the text to produce a plurality of categories, each category associated with a first command and wherein each category is associated with a confidence score that specifies a network enabled appliance having a corresponding target command protocol and the first command specifies an operation to be performed on the target network enabled appliance;
classifying the text to produce a target command corresponding to one of a plurality of personal assistants, wherein different personal assistants comprise different target command protocols for executing different operations on different network enabled appliances and wherein the target command includes the wake-word of the corresponding one of the plurality of personal assistants; and
sending the target command for execution by a backend system corresponding to the one of the plurality of personal assistants, and in accordance therewith, performing an operation on a target network enabled appliance.

17. The personal assistant controller of claim 16 wherein executing the target command comprises:
converting the target command to an audio signal; and
playing the audio signal through a speaker located within an audio range of the one of the plurality of personal assistants.

18. The personal assistant controller of claim 16 wherein executing the target command comprises sending the target command to one of a plurality of backend systems corresponding to the one of the plurality of personal assistants, wherein the one of the plurality of backend systems translates the target command into instructions for causing the target network enabled appliance to perform a specified operation.

19. The personal assistant controller of claim 16 further comprising changing the target command generated in response to the voice audio signal over time based on user feedback.

* * * * *